June 28, 1960 M. A. HUSO 2,942,794
SHEET REEL
Filed March 4, 1957
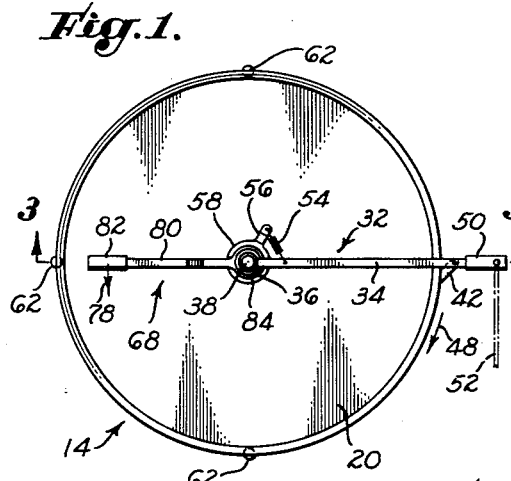
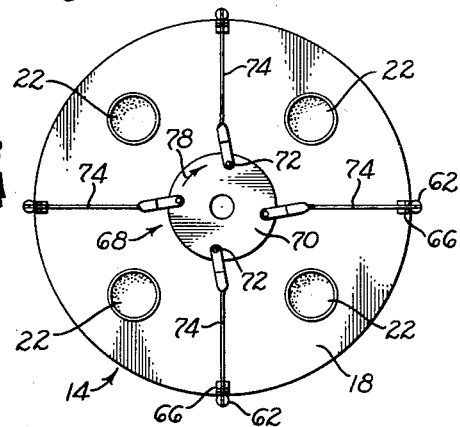
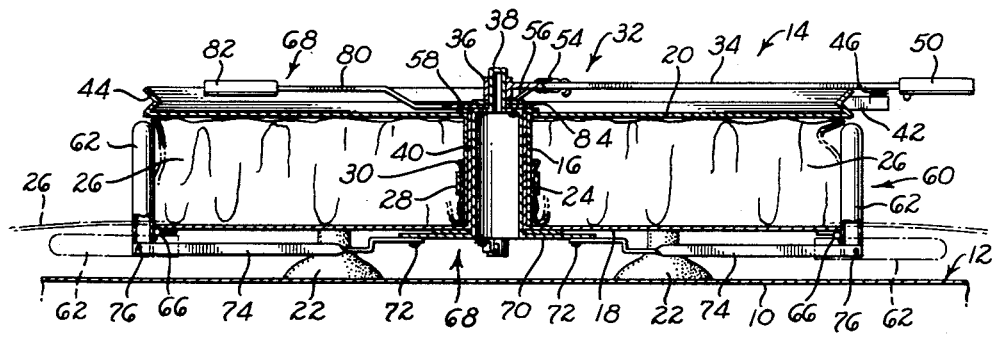
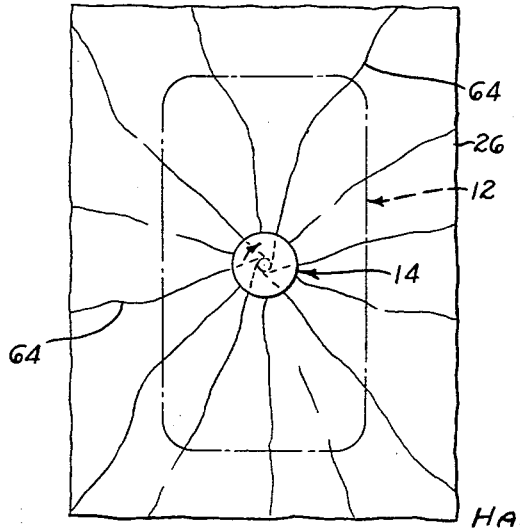
INVENTOR.
MAURICE A. HUSO
BY HIS ATTORNEYS.
HARRIS, KIECH, FOSTER & HARRIS

United States Patent Office 2,942,794
Patented June 28, 1960

2,942,794

SHEET REEL

Maurice A. Huso, 5310 Los Lomas, Long Beach, Calif.

Filed Mar. 4, 1957, Ser. No. 643,732

10 Claims. (Cl. 242—55)

The present invention relates in general to reels and, more particularly, to reels for sheets of fabric, or other materials.

The invention is particularly applicable to a reel for a tarpaulin for covering an automobile to protect it from the weather. Consequently, the invention will be considered hereinafter as applied to an automobile tarpaulin reel, as a matter of convenience, with the understanding that it is susceptible of a wide variety of other applications.

In order to protect an automobile which is parked out of doors from the effects of the sun, wind, snow, hail, dew, dust, air-borne chemicals, and like factors, it is desirable to provide the automobile with a protective covering. Ordinarily, this protective covering takes the form of a sheet or tarpaulin which is placed over the automobile manually, which requires considerable time and effort. Automobile tarpaulin reels have been proposed heretofore, but such reels have uniformly been of the window-shade type which requires a device having a substantial axial length. This is obviously undesirable since the resultant large over-all dimensions produce a device which is difficult to mount, unsightly, and the like.

A primary object of the invention is to provide a tarpaulin reel which is relatively small and compact and which has no large dimension, compared to the dimensions of the automobile on which it is to be used, in any direction. Consequently, the reel of the invention may readily be mounted on an automobile and is relatively inconspicuous when installed thereon. Preferably, the tarpaulin reel of the invention is mounted on the roof of the automobile, but it may be mounted in other locations in some instances.

An important object of the invention is to provide a tarpaulin reel to which the tarpaulin is connected and which is rotatable about an axis extending generally transversely of the tarpaulin, i.e., of the plane of the tarpaulin when the tarpaulin is laid out flat, as contrasted to the window-shade type of tarpaulin reel wherein the axis of rotation of the reel is parallel to the tarpaulin.

Another object is to provide a device wherein the tarpaulin is connected to the reel at a point inwardly of the edges of the tarpaulin, and preferably at a point near the center of the tarpaulin. The precise point at which the tarpaulin is connected to the reel depends somewhat on the location of the reel relative to the automobile. For example, if a convenient location for the reel is rearwardly of the center of the automobile, a corresponding point of connection of the tarpaulin to the reel is selected. In some instances, it may even be desirable to connect the tarpaulin to the reel adjacent one edge of the tarpaulin, the axis of the reel extending generally transversely of the tarpaulin in any event.

Another object is to provide a reel which includes a hub element and two axially spaced end elements between which the tarpaulin is disposed as it is wound onto the hub element. At least one of these elements is rotatable about the axis of the reel, the tarpaulin being connected to such rotatable element. Preferably, the hub element of the reel is rotatable and the tarpaulin is connected thereto.

A further object of the invention is to provide guide means spaced from the axis of the reel for guiding the tarpaulin into or onto the reel in a uniform manner so as to prevent non-uniform bunching or gathering of the tarpaulin as it is wound onto the reel.

Another object is to provide a guide means which includes circumferentially spaced guide elements disposed in extended, guiding positions wherein they extend across the space between the end elements of the reel and are engageable with the tarpaulin to guide it onto the reel in a manner uniformly distributing the winding of the various portions of the tarpaulin onto the reel.

Still another object of the invention is to make such guide elements movable from the extended, guiding positions mentioned into retracted, non-guiding positions wherein they are withdrawn from the space between the end elements of the reel and are disengaged from the tarpaulin. When the guide elements are in such retracted, non-guiding positions, the tarpaulin may be unwound from the reel readily and rapidly without interference by the guide elements, which is an important feature.

The foregoing objects, advantages, features and results of the present invention, together with various other objects, advantages, features and results thereof which will be apparent in the light of this disclosure, may be attained with the exemplary embodiment of the invention illustrated in the accompanying drawing and described in detail hereinafter. It will be understood that the embodiment of the invention illustrated in the drawing is illustrative only and that various components of this embodiment may be modified in various ways, or replaced by other, equivalent components, within the scope of the invention. In the drawing:

Fig. 1 is a top plan view of the tarpaulin reel of the invention;

Fig. 2 is a bottom plan view thereof;

Fig. 3 is an enlarged, sectional view taken along the arrowed line 3—3 of Fig. 1 and showing the tarpaulin reel of the invention installed on an automobile; and Fig. 4 is a semidiagrammatic view on a reduced scale illustrating the manner in which the tarpaulin reel of the invention winds a tarpaulin thereonto.

Referring to the drawing, the numeral 10 designates the top of an automobile 12 on which the tarpaulin reel of the invention, designated generally by the numeral 14, is mounted.

The reel 14 includes a rotatable hub or hub element 16 which is flanked by two axially spaced end elements 18 and 20 having the form of annular plates or disks in the particular construction illustrated. The lower disk 18 is stationary in the particular construction illustrated and is provided on its lower surface with suction cups 22 for attaching the reel 14 to the top 10 of the automobile 12.

Integral with or connected to the stationary lower disk 18 is a stationary tubular axle 24 which projects upwardly and over which the hub 16 is telescoped, the hub being rotatable on the axle 24 and the lower end of the hub resting on the lower disk 18 to maintain the disks 18 and 20 in axially spaced relation. In the construction illustrated, the upper disk 20 is integral with or connected to the hub 16 so as to be rotatable therewith.

A tarpaulin, or, more generally, a sheet, 26 is adapted to be wound on the reel 14, or, more accurately, onto the hub 16 between the disks 18 and 20. The reel 14 and the tarpaulin 26 are so oriented relative to each other that the axis of rotation of the hub 16 extends generally transversely of the tarpaulin. More specifically, the axis of rotation of the hub 16 is generally perpendicular to the plane of the tarpaulin 26 when the latter is laid out flat, as suggested in Fig. 4 of the drawing, the tarpaulin being shown laid out flat in this figure for convenience in illustrating it.

The tarpaulin 26 is attached to the hub 16 in any suitable manner, as by means of a band 28 clamping the tarpaulin to the hub. In the construction illustrated, wherein the reel 14 is adapted to be mounted on the top 10 of the automobile 12 approximately at the center of the automobile, considering the automobile as viewed from above, the tarpaulin is attached to the hub 16 inwardly of the edges of the tarpaulin and approximately at the center thereof. In this case, the tarpaulin 26 is provided with an approximately central aperture 30 through which the hub 16 extends, the band 28 engaging the tarpaulin around the periphery of the aperture 30. With this construction, as the hub 16 is rotated, the central portion of the tarpaulin 26 rotates with the hub to wind the tarpaulin onto the reel 14, i.e., onto the hub 16 between the disks 18 and 20.

The reel 14 includes means 32 for rotating the hub 16. In the construction illustrated, the hub rotating means includes a radial lever 34 having at its inner end a hub 36 rotatably mounted on a shaft-like extension 38 of an inner hub 40 rotatable within the tubular axle 24. The purpose of making the inner hub rotatable will be explained hereinafter.

In the construction shown, the rotating means 32 includes a pawl 42 which is pivotally mounted on the lever 34 and which is biased into engagement with the walls of an annular groove or channel 44 formed in the periphery of the disk 20 by a torsion spring 46. The pawl 42 may frictionally engage the walls of the groove 44, or the latter may be provided with teeth, not shown, engageable by the pawl.

As will be apparent, when the lever 34 is rotated in the clockwise direction, as indicated by the arrow 48 of Fig. 1, the pawl 42 seats against the walls of the groove 44 to rotate the upper disk 20 and the hub 16 in the same direction, thereby winding the tarpaulin 26 onto the hub. Preferably, the rotation of the upper disk 20 and the hub 16 is produced by oscillating the lever 34 through a relatively small angle, as by gripping a handle 50 at the outer end of the lever 34, or, more conveniently, by means of a pull cord 52 attached to the outer end of the lever and readily operable by one standing alongside the automobile 12. The lever 34 is returned to its starting position after each forward or clockwise stroke thereof by a return spring 54 connected at one end to the lever 34 and at its other end to an arm 56 having at its inner end an annulus 58 connected to or integral with the stationary axle 24 so as to remain stationary to provide an anchor for the return spring 54.

It will be understood that various other means for rotating the hub 16 may be employed, the means 32 being illustrative only.

In order to feed the various portions of the tarpaulin 26 onto the hub 16 uniformly in winding the tarpaulin thereon, so as to prevent nonuniform bunching of the various portions of the tarpaulin as it is wound up, the reel 14 includes means 60 spaced from the axis of rotation of the hub and engageable with the tarpaulin for guiding it into the reel 14 properly. This guiding means includes a plurality of circumferentially spaced guide elements 62 carried by the stationary lower disk 18 adjacent the periphery thereof and extending axially upwardly across the space between the lower disk 18 and the upper disk 20, the guide elements, which are finger-like in the particular construction illustrated, terminating just short of the upper disk 20. When the tarpaulin 26 is wound onto the hub 16, it is fed into the space between the disks 18 and 20 through the clearance between the upper ends of the guide elements 62 and the upper disk 20, the tarpaulin forming generally radial, downwardly opening folds 64, Fig. 4, into which the upwardly extending guide elements 62 project. In other words, the material forming certain of the generally radial folds 64 is draped over the guide elements 62. The material of the tarpaulin 26 outwardly of the periphery of the reel 14 is thus prevented from rotating with the portion of the tarpaulin which is being wound around the hub 16 as the latter is rotated, there being, in effect, a threaded engagement, or a tongue-and-groove engagement, between the guide elements 62 and the folds 64 in the tarpaulin. Consequently, approximately equal-sized portions of the tarpaulin 26 are fed into the space between the disks 18 and 20 of the reel between each pair of adjacent guide elements 62. This insures uniform feeding of the tarpaulin into the reel 14 as the tarpaulin is wound on the hub 16, the various sectors of the tarpaulin passing between pairs of adjacent guide elements 62 being substantially uniform and being bunched or gathered substantially uniformly by the guide elements. The net result of this action is that the tarpaulin 26 is wound onto the hub 16 between the disks 18 and 20 evenly and uniformly, which is an important feature of the invention.

In order to facilitate unwinding of the tarpaulin 26 when it is desired to utilize it to cover the automobile 12, the guide elements 62 are made retractable into positions wherein they perform no guiding function and are disengaged from the tarpaulin. The extended, or operative, guiding positions of the guide elements 62 are shown in solid lines in Fig. 3 of the drawing, and the retracted, or inoperative, nonguiding positions thereof are shown in broken lines, the elements 62, when in their nonguiding positions, being clear of the space between the disks 18 and 20.

Considering the manner in which the guide elements 62 are extended and retracted, each guide element is mounted on the stationary lower disk 18, for downward and outward movement from its extended position to its retracted position, by a pivot pin 66. Means 68 is provided for pivoting the guide elements 62 between their extended and retracted positions in unison. The means 68 includes a plate or disk 70 below the lower disk 18 of the reel 14 and connected to or integral with the lower end of the rotatable inner hub 40. Connected to the disk 70 by vertical, axial pivots 72 are connecting links 74 the outer ends of which are attached to the lower ends of the guide elements 62, below the pivot pins 66, by horizontal, circumferentially extending pivot pins 76. As will be apparent, if the disk 70 is rotated in the direction of the arrow 78 in Fig. 2 of the drawing, the links 74 pull inwardly on the lower ends of the guide elements 62 to pivot the guide elements, about the axes of the pivot pins 66, into their retracted positions.

The pivoting means 68 includes a radial lever 80 located above the upper disk 20 of the reel 14 and having at its outer end a handle 82. The inner end of this lever is provided with an annulus 84 which is integral with or connected to the upper end of the inner hub 40. Thus, by moving the lever 80 about the axis of the device, the disk 70 is rotated, through the hub 40, to extend or retract the guide elements 62.

Considering the over-all operation of the invention, the reel 14 is first placed on the top 10 of the automobile 12 substantially at the center of the automobile in the particular construction illustrated, the suction cups 22 holding the reel 14 in place. As previously indicated and as clearly shown in Fig. 4, the lateral dimensions of the reel 14 are small as compared to the lateral dimensions of the automobile 12, e.g., the diameter of the reel is small as compared to the length and width of the automobile, so that the reel is relatively inconspicuous. Of course, since the tarpaulin 26 has lateral dimensions which are larger than those of the automobile 12 to enable the tarpaulin to completely cover the automobile, it inherently follows that the lateral dimensions of the tarpaulin are much larger than the lateral dimensions of the reel 14, e.g., the length and width of the tarpaulin are much larger than the diameter of the reel.

Assuming that the reel 14 is installed on the automobile 12 with the tarpaulin 26 wound onto the hub 16, the lever 80 is moved to a position to retract the guide elements 62, whereupon the tarpaulin 26 may be grasped manually and unwound, as indicated by the broken-line position of the tarpaulin in Fig. 3. The tarpaulin is then distributed uniformly over the automobile 12 until the entire automobile is covered, the tarpaulin being tied down, if desired, in any suitable manner to prevent its displacement by the wind.

When it is desired to wind up the tarpaulin 26, the guide elements 62 are disposed in their extended positions and, after releasing the tarpaulin 26 from the automobile, if it is tied down, the lever 34 is oscillated, in the manner hereinbefore described, to rotate the hub 16 in a manner to wind the tarpaulin 26 thereonto. As hereinbefore explained, the guide elements 62 feed the tarpaulin 26 onto the hub 16 and into the space between the disks 18 and 20 in a uniform manner, the various sectors of the tarpaulin being gathered or bunched uniformly by the guide elements to insure winding of the tarpaulin onto the reel 14 smoothly and evenly.

Although an exemplary embodiment of the invention has been described herein for purposes of illustration, it will be understood that various changes, modifications and substitutions may be incorporated in the embodiment disclosed without departing from the spirit of the invention as defined by the claims which follow.

I claim as my invention:

1. In combination: a sheet; a reel including hub and end elements at least one of which is rotatable about an axis extending generally perpendicularly of the plane of said sheet and is connected to said sheet at a point inwardly of the edges of said sheet, said sheet having lateral dimensions in directions perpendicular to said axis which are respectively larger than corresponding dimensions of said reel; guide means spaced from said axis for guiding said sheet into said reel and onto said hub element thereof in response to rotation of said rotatable element of said reel, said guide means including circumferentially spaced guide elements, said guide elements being movable between extended, guiding positions wherein they extend across the space between said end elements of said reel and are engageable with said sheet, and retracted, non-guiding positions wherein they are withdrawn from the space between said end elements of said reel and are disengaged from said sheet; means for moving said guide elements between said extended and retracted positions in unison; and means for rotating said rotatable element.

2. The combination set forth in claim 1 wherein said hub element is said rotatable element.

3. The combination set forth in claim 1 wherein said guide elements are pivotable outwardly and axially from said extended positions into said retracted positions.

4. In combination: a sheet; a reel including hub and end elements at least one of which is rotatable about an axis extending generally perpendicularly of the plane of said sheet and is connected to said sheet at a point inwardly of the edges of said sheet, said sheet having lateral dimensions in directions perpendicular to said axis which are respectively larger than corresponding dimensions of said reel; guide means spaced from said axis for guiding said sheet into said reel and onto said hub element thereof in response to rotation of said rotatable element of said reel, said guide means including circumferentially spaced guide elements, said guide elements and at least one of said end elements of said reel being relatively movable toward and away from each other; and means for rotating said rotatable element.

5. In combination: a sheet; a supporting structure; a reel carried by said supporting structure and including hub and end elements at least one of which is rotatable about an axis extending generally perpendicularly of the plane of said sheet and which is connected to said sheet at a point inwardly of the edges thereof, said sheet having lateral dimensions in directions perpendicular to said axis which are respectively larger than corresponding dimensions of said reel; guide means carried by said supporting structure and spaced from said axis for guiding said sheet into said reel and onto said hub element thereof in response to rotation of said rotatable element of said reel, said guide means including circumferentially spaced guide elements, said guide elements and at least one of said end elements of said reel being relatively movable in directions to increase and decrease the distance therebetween; and means for rotating said rotatable element.

6. The combination set forth in claim 5 wherein said guide elements are movable relative to said supporting structure in said directions.

7. In combination: a sheet of readily foldable flexible material; a reel rotatable about an axis extending generally perpendicular to said sheet and connected to said sheet at a point within the lateral boundaries thereof and with the sheet extending radially therefrom in all directions; and means for rotating said reel whereby said sheet is drawn inwardly to said reel from all sides thereof simultaneously.

8. The combination defined in claim 7 including means spaced from said axis for guiding said sheet onto said reel.

9. The combination defined in claim 7 wherein said reel includes a hub and end elements at least one of which is rotatable about said axis.

10. The combination defined in claim 7 wherein said sheet has a hole therethrough at said axis; said reel including a rotatable element on said axis and extending through said hole, the portion of said sheet at the periphery of said hole being secured to said rotatable element.

References Cited in the file of this patent

UNITED STATES PATENTS

| 721,993 | Arnett | Mar. 3, 1903 |
| 1,801,711 | Asher | Apr. 21, 1931 |
| 2,688,973 | Reiman | Sept. 14, 1954 |

FOREIGN PATENTS

| 405,801 | Great Britain | Feb. 15, 1934 |